Feb. 17, 1970          J. L. DAILEY          3,495,892
SPLIT BEAM LIGHT MODULATOR
Filed Jan. 21, 1966                    4 Sheets-Sheet 1

INVENTOR.
JOHN L. DAILEY
BY Edward J Norton
Attorney

INVENTOR.
JOHN L. DAILEY
BY Edward J Norton
Attorney

Feb. 17, 1970  J. L. DAILEY  3,495,892
SPLIT BEAM LIGHT MODULATOR
Filed Jan. 21, 1966  4 Sheets-Sheet 4

INVENTOR.
JOHN L. DAILEY
BY
Edward J Norton
Attorney

United States Patent Office 3,495,892
Patented Feb. 17, 1970

3,495,892
SPLIT BEAM LIGHT MODULATOR
John L. Dailey, West Berlin, N.J., assignor to RCA
Corporation, a corporation of Delaware
Filed Jan. 21, 1966, Ser. No. 522,211
Int. Cl. G02f 1/26, 1/22, 1/24
U.S. Cl. 350—150    11 Claims

ABSTRACT OF THE DISCLOSURE

A light modulator utilizing a birefringent crystal, such as KDP, operated in its transverse mode to provide a very low power loss per mc. of the modulating signal. By passing only one of the split beams of light through the crystal with its electric vector polarized perpendicular to the optic axis thereof the birefringence of the crystal is overcome and the aperture is greatly widened.

This invention relates to light modulators and, more particularly, to an improved light modulator incorporating a variable phase means comprising normally birefringent electro-optic crystal material.

The term "light," as used herein, means electromagnetic energy of any given frequency within the infrared, the visible or the ultraviolet spectrum.

The term "electro-optic crystal material," as used herein, means a material having a crystalline structure which is substantially transparent to light of a given frequency transmitted therethrough and which has an index of refraction which is a function of the magnitude of an electric field applied to the crystal material.

The path length in wave lengths of light of a given frequency transmitted through a crystal depends both on the length of the crystal through which it is transmitted and the index of refraction of this crystal. Therefore, by varying the index of refraction of an electro-optic crystal in accordance with a magnitude of an applied electric field, the path length in wave lengths of the light transmitted through the crystal will vary, and hence the phase of the light emerging from the crystal will vary in accordance with the variation in the electric field applied to the crystal. Thus, it will be seen that an electro-optic crystal may be utilized to modulate light in accordance with an applied electric signal. This fact is well known in the art.

However, many problems still exist in making a practical electro-optic light modulator. First, although the electro-optic effect varies widely among different electro-optic crystal materials, in all cases the electro-optic effect is extremely small, being of the order of $10^{-11}$ meter/volt or less. This means that in order to obtain an appreciable variation in phase of the light emerging from the crystal, it is necessary that the path length of the light transmitted through the crystal should be quite long and that the applied electric field should be quite strong. Furthermore, the crystal material should be of high quality, i.e., it should absorb a minimum of light and should have a substantially flawless crystal structure which approaches the ideal. Unfortunately, at the present time it has not been possible to grow many different types of electro-optic crystals of the required long length and high quality needed for a practical light modulator. For instance, cubic crystals of the so-called $T_d^2$ structure, such as zinc sulphide or cuprous chloride, if they were available in adequate size and quality, would be particularly well suited for use in a light modulator. However, at present such crystals are not obtainable.

Another problem is that many electro-optic crystal materials exhibit excessive piezo-electric resonances which are so strong that a transmitted signal is distorted almost beyond recognition. Such an electro-optic crystal material is KTN. Another disadvantage of KTN electro-optic material for use in a light modulator is that it has a very high dielectric constant. Therefore, the capacitance of a piece thereof of useful size is so large that it creates a severe high frequency impedance matching problem in applying an electric modulating signal thereto.

Another problem of electro-optic crystal light modulators is due to the fact that they are subject to dielectric heating in response to an alternating electric field being applied thereto. This heating is proportional to the square of the electric field generating voltage applied thereacross, the capacitance of the electro-optic crystal material, and the frequency of alternation of the electric field. Therefore, if the voltage is high, in order to prevent over-heating of the crystal material, it is necessary to limit drastically the frequency of alternation of the electric field. However, one of the most important desired features of a light modulator is that it is capable of being modulated by a wide band signal. If wide band signals, i.e., signals having a high frequency of alternation, result in over-heating an electro-optic crystal light modulator, the light modulator is obviously not practical.

The present invention is directed to an electro-optic crystal light modulator which, to a large degree, overcomes each and every one of the above discussed problems which render presently existing crystal light modulators unsatisfactory. More particularly, the present invention is directed to the employment of normally birefringent electro-optic crystals, such as the isomorphs of KDP (potassium dihydrogen phosphate), and especially KDP itself, operated in the transverse mode (the electric field parallel to the optic axis of the crystal and the light propagated in a direction perpendicular to the optic axis thereof) in a manner such that the normally birefringent crystal appears isotropic with respect to the light transmitted therethrough. The isomorphs of KDP consist of crystal materials wherein potassium may be replaced by ammonium, rubidium or caseium; hydrogen may be replaced by deuterium, or phosphorous may be replaced by arsenic.

The isomorphs of KDP, and especially KDP itself, despite the fact that they are normally birefringent, have been utilized heretofore in optical devices, including light modulators, because they are available in clear, strain-free, relatively large pieces of good quality. Further, KDP and its isomorphs have tolerable piezo-electric resonances and dielectric constants. In addition, KDP and its isomorphs exhibit a relatively large electro-optic effect. Considering all these factors, KDP, itself, is the preferred material.

However, in the past, in order to minimize the problem of birefringence, it has been the practice to operate light modulators incorporating KDP, or one of its isomorphs, only in its longitudinal mode (with both the electric field and the direction of transmission of the light parallel to the optic axis of the crystal), rather than in the transverse mode. The reason for this is that birefringence is a minimum when light is propagated substantially parallel to the optic axis of a birefringent crystal.

The performance of birefringent electro-optic crystals operated in their longitudinal mode is relatively poor, however, for several reasons. First, the angular aperture of a birefringent crystal operated in its longitudinal mode is extremely small, so that it is very difficult to align the optic axis of the crystal with the beam of light to be transmitted therehrough. Second, since in the longitudinal mode the electric field is parallel to the direction of propagation of light through the crystal, transparent electrodes absorb much of the impingent light. Third, and most important, the dual requirements of having both a high magnitude electric field and a long path length for the light transmitted through the crystal, discussed above, are mutually antagonistic when a crystal is operated in its longitudinal mode, since the electric field and the direction of light transmission are in the same direction. More particularly, the magnitude of the electric field is equal to the applied voltage divided by the distance across the crystal, while this distance, in the longitudinal mode, is equal to the path length of the light through the crystal. This means that in the longitudinal mode, in order to obtain any appreciable phase variation, high voltages in the order of 7–10 kv. must be employed. However, as previously described, a crystal is dielectrically heated in proportion to the sequare of the alternating signal voltage applied thereto and in proportion to the frequency of alternation of this signal voltage. Therefore, in order to prevent damage to the crystal by overheating in the operation KDP or one of its isomorphs in its longitudinal mode in a light modulator, it is necessary, due to the large voltage required, to either limit the modulation index to only a few percent at relatively high signal modulating frequencies, such as television frequencies, or limit the maximum modulating signal frequencies to a low value. Since one of the most attractive factors of modulating light is that it is capable of being modulated over a wide band of frequencies, due to its own extremely high frequency, the severe limitation in the modulating signal frequency to avoid overheating of the crystal renders KDP light modulators employing KDP operated in the longitudinal mode unsatisfactory.

However, when KDP is operated in its transverse mode, its thickness parallel to its optic axis may be made small so that a relatively large magnitude electric field may be obtained from a relatively small voltage, and the length thereof perpendicular to the optic axis and parallel to the transmission of light therethrough may be made long without effecting the magnitude of the electric field. In fact, by arranging a plurality of crystals end to end, the path length of the light transmitted therethrough may be increased to a very large value. In this manner, with directly applied electrodes, a modulation index of one hundred percent may be achieved for signal band widths up to 400 mc. with a power dissipation of only a few milliwatts per megacycle of band width, so that the crystal is not overheated. If the crystal is placed within a cavity, band widths exceeding 400 mc. may be achieved. Furthermore, since the light is transmitted perpendicular to the direction of the electric field, the light does not have to pass through the electrodes, so that high light transmission is obtained wthout the need for transparent electrodes.

However, birefringence is a maximum when KDP is operated in its transverse mode. This problem of the normally very high birefringence of KDP when operated in the transverse mode is overcome in the present invention by plane polarizing the light which is incident on the crystal and transmitting it through the crystal with the electric victor thereof substantially perpendicular to the optic axis of the crystal. Under these conditions the angular aperture widens to a thousand times the divergence of a laser beam. Therefore, when a laser is employd as the light source, the alignment problem is minimal.

Accordingly, it is an object of the present invention to provide an improved crystal light modulator.

It is a more specific object of the present invention to provide a crystal light modulator utilizing a normally birefringent crystal in the transverse mode in a manner such that it appears substantially isotropic to light transmitted therethrough.

Other objects, features and advantages of the present invention will become more apparent from the following detailed description taken together with the accompanying drawings:

Figure 1:
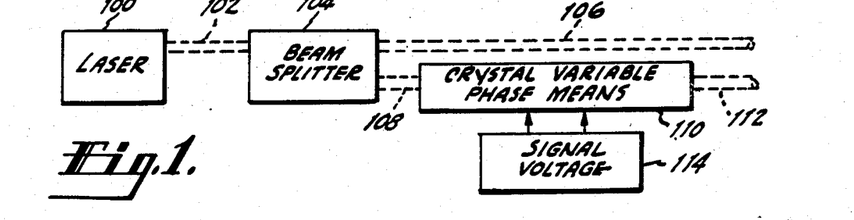
FIGURE 1 is a block diagram showing broadly a first configuration which the present invention may take.

Referring now to FIGURE 1, a source of monochromatic spatially coherent light, i.e., light composed of substantially a single frequency which is emitted from an effective point source, which is preferably a laser such as laser 100, produces a beam of plane polarized monochromatic spatially coherent light. Beam 102 is applied to beam splitter 104, which splits beam 102 into two separate light beams 106 and 108, respectively. Solely one of these two beams, such as beam 108 is transmitted through crystal variable phase means 110 to emerge therefrom as beam 112, while beam 106 is transmitted in a direction parallel to beams 108 and 112 entirely outside of crystal variable phase means 110. Crystal variable phase means 110 has a signal voltage applied thereto from signal voltage source 114 which causes the index of refraction of crystal variable phase means 110 to vary in accordance with the magnitude of the applied signal voltage. Therefore, the relative phase of beam 112 emerging from crystal variable phase means 110 with respect to that of beam 106 will vary in accordance with the applied signal voltage.

Figures 2, 3:
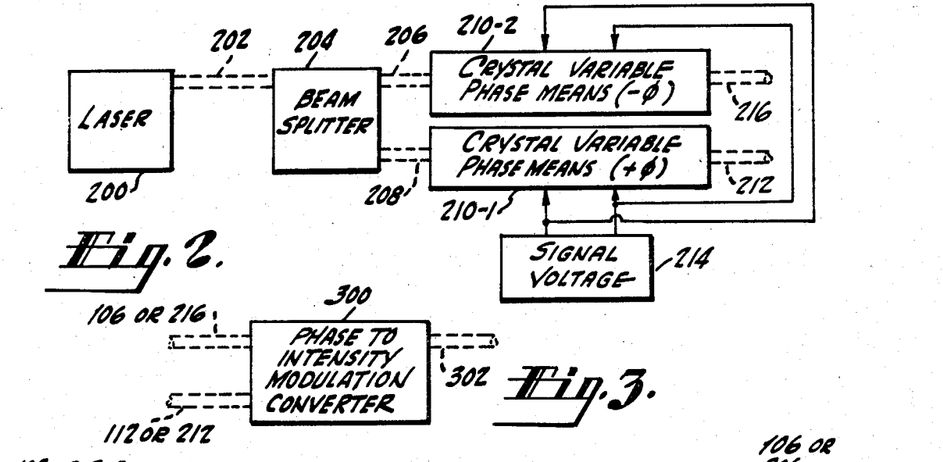
FIGURE 2 is a block diagram showing broadly a second configuration which the present invention may take.
FIGURE 3 is a block diagram of a phase-to-intensity modulation converter which may be added to the configurations shown in either FIGURE 1 or FIGURE 2 to provide an intensity modulation output.

In FIGURE 2, the elements comprising laser 200, beam 202, beam splitter 204, beam 206 and 208 and source of signal voltage 214 are of equivalent structure and function to the corresponding elements of FIGURE 1 comprising laser 100, beam 102, beam splitter 104, beams 106 and 108 and source of signal voltage 114. However, in FIGURE 2 the single crystal variable phase means 110 solely in the path of beam 108 in FIGURE 1 is replaced by crystal variable phase means 210-1 solely in the path of beam 208 and crystal variable phase means 210-2 solely in the path of beam 206, as shown. Signal voltage from source 214 is applied to both crystal variable phase means 210–1 and 210–2. However, the signal voltage causes the index of refraction of crystal variable phase means 210–1 and 210–2, respectively, to vary in opposite senses in accordance therewith. Therefore, all other things being equal, the relative phase difference of beam 212 emerging from crystal variable phase means 210–1 with respect to beam 216 emerging from crystal variable phase means 210–2 will be twice as much as the relative phase difference of beam 112 with respect to beam 106 of FIGURE 1.

Thus, it will be seen that the respective configurations of both FIGURE 1 and FIGURE 2 serve to phase modulate the two light beams emerging therefrom with respect to each other in accordance with an applied signal voltage. If intensity modulation, rather than phase modulation, is desired, the two emerging light beams 106 and 112 or 216 and 212, as the case may be, may be applied as inputs to phase-to-intensity modulation converter 300, shown in FIGURE 3, where they are combined to form a single intensity modulated output light beam 302.

Figure 4A:
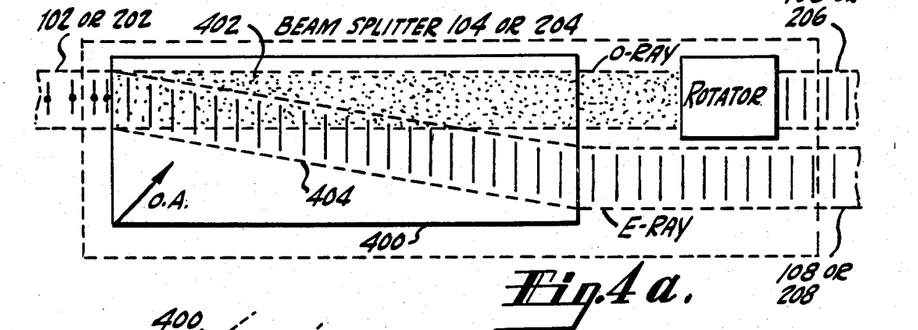
FIGURES 4A and 4B show a first preferred embodiment of the beam splitter shown in FIGURES 1 and 2 which may be utilized when it is desired to obtain a phase modulation output.
Figure 4B:
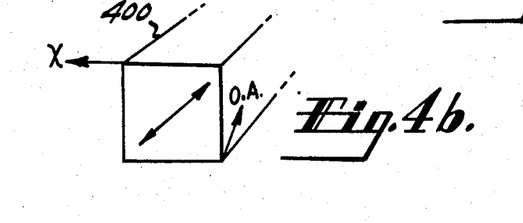

In the case where phase modulation is desired, the beam splitter shown in either FIGURE 1 or FIGURE 2 may take the form shown in FIGURES 4A and 4B. More particularly, as shown in FIGURES 4A and 4B, the beam splitter comprises a longitudinal block of birefringent crystal 400, composed of a material such as calcite or sodium nitrate, which is cut with its optic axis at forty-five degrees with respect to the length thereof and with its x crystallographic axis perpendicular to the length thereof. The plane polarized laser beam 102 or 202, as the case may be, is applied to crystal 400 parallel to the length thereof and normal to the front face thereof with its electric vector polarized at substantially forty-five degrees with respect to the x crystallographic axis, as shown in FIGURE 4B. Under these conditions, the impinging light beam will be split into an ordinary or O ray 402 and an extraordinary or E ray 404 of equal amplitude. The O ray beam 402 and the E ray beam 404 are polarized orthogonally with respect to each other with the O ray beam 402 having its electric vector polarized in a direction into the paper, as shown in FIGURE 4A and the E ray beam 404 having its electric vector polarized in a vertical direction, as shown in FIGURE 4A. The O ray beam 402 will proceed through crystal 400 without refraction in a direction parallel to the length thereof. However, the E ray beam 404 will be refracted at an angle which, at substantially normal incidence, is solely dependent upon the particular material of which crystal 400 is composed, and will, upon emerging from crystal 400, be refracted back to a direction parallel to O ray beam 402. The length of crystal 400 is chosen to have a value such that the separation between the centers of O ray beam 402 and E ray beam 404 upon emerging from crystal 400 will be just greater than the width of the individual beams, as shown in FIGURE 4A. The width of a typical laser beam is between 5 mm. and 7 mm.

If phase modulation is desired, it is essential that both the O ray beam and the E ray beam be polarized in the same plane. Therefore, as shown in FIGURE 4A, O ray beam 402 is rotated ninety degrees by rotator 406, which may be a properly cut quartz crystal or a half wave plate, to produce output beam 106 which is plane polarized in the vertical plane as is E ray output beam 108. Of course, rotator 406 could be placed in the path of the E ray beam, instead of the O ray beam, to produce two output beams which are plane polarized in the direction of O ray beam 402.

Figure 5A:
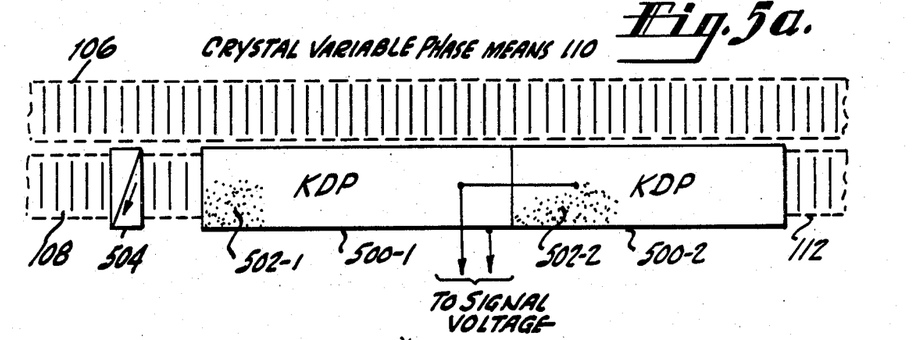
FIGURES 5A and 5B show a first preferred embodiment of the crystal variable phase means shown in FIGURE 1 which may be utilized when it is desired to obtain a phase modulation output.
Figure 5B:
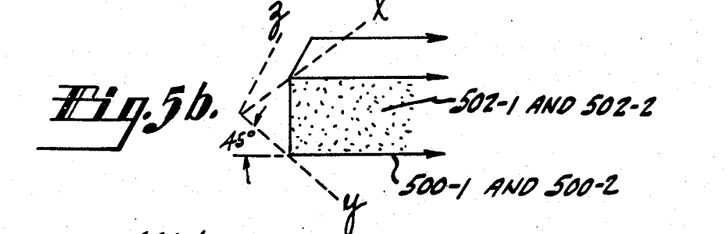

Referring now to FIGURES 5A and 5B, there is shown a preferred embodiment of crystal variable phase means 110 of FIGURE 1. Crystal variable phase means 110 may comprise either a single longitudinal block or a plurality of longitudinal blocks placed end to end of a normally birefringent electro-optic crystal material, such as KDP or one of its isomorphs. For illustrative purposes, the crystal variable phase means 110 shown in FIGURE 5A comprises two longitudinal blocks of KDP, 500–1 and 500–2, respectively, placed end to end. As shown in FIGURE 5B, each of blocks 500–1 and 500–2 is cut with its optic or z crystallographic axis in a direction into the paper and with the plane defined by its x and y crystallographic axes in the plane of the paper. The length of each of blocks 500–1 and 500–2 as shown in FIGURE 5B, is oriented in the plane defined by the x and y crystallographic axes at an angle of forty-five degrees with respect to the x crystallographic axis. The reason for cutting the block of KDP crystal in this manner is that, as shown by Billings, in his article appearing on page 797 of volume 39 of the "Journal of the Optical Society of America" for 1949, the semi-axes of the electro-optic index of refraction ellipse for KDP and its isomorphs, in response to an electric field applied parallel to the z crystallographic axis thereof, lie in the plane defined by the x and y crystallographic axis thereof at a forty-five degree angle with respect to the x crystallographic axis. Thus, the electro-optic effect will be a maximum when light is transmitted through the crystal at a forty-five degree angle with respect to the x crystallographic axis. However, although less than the maximum, there will be some electro-optic effect even if the light is transmitted at an angle other than forty-five degrees with respect to the x crystallographic axis, so long as it is not transmitted in a direction parallel to either the x or y crystallographic axis.

As shown in FIGURES 5A and 5B, each of blocks 500–1 and 500–2 have electrodes 502–1 and 502–2 covering the two opposite sides thereof which lie in the plane defined by the x and y crystallographic axes. As shown in FIGURE 5A, signal voltage is applied to these electrodes 502–1 and 502–2 to thereby produce an electric field throughout blocks 502–1 and 502–2 which is in a direction parallel to the z crystallographic axis thereof.

As shown in FIGURE 5A, beam 108 is applied through glass wedges 504, which are movable with respect to each other by means not shown, to impinge upon the front face of block 502–1 with its electric vector polarized in a direction which is at least substantially parallel to the plane defined by the x and y crystallographic axes of blocks 500–1 and 500–2. Since this is so, despite the fact that KDP is normally birefringent, blocks 500–1 and 500–2 will appear substantially isotropic with respect to the transmission of light beam 108 therethrough.

The reason for this is that light transmitted through a birefringent crystal is broken up into an ordinary ray first component and an extraordinary ray second component. The ordinary ray component is plane polarized in the plane defined by the x and y crystallographic axes thereof and has an amplitude proportional to the cosine of the angle between the electric vector of the impinging light beam and the plane defined by the x and y crystallographic axes thereof. The extraordinary ray second component is plane polarized perpendicular to the plane defined by the x and y crystallographic axes thereof and has an amplitude proportional to the sine of this angle. However, since the electric vector of the impinging light, in the case under discussion, is polarized in a direction substantially parallel to the plane defined by the x and y crystallographic axes of blocks 500–1 and 500–2, this angle, in this case, is substantially zero. Therefore, the sine of this angle is substantially zero and the amplitude of the extraordinary ray propagated through blocks 500–1 and 500–2 is substantially zero. Thus, only the ordinary ray first component will be propagated through blocks 500–1 and 500–2, so that under the conditions that prevail the normally birefringent blocks 500–1 and 500–2 appear isotropic to the transmission of light beam 108 therethrough.

As shown in FIGURE 5A, light beam 106 is transmitted in a direction parallel to light beam 108 and in close proximity thereto, but entirely outside of blocks 500–1 and 500–2. The phase of light beam 112 emerging from block 500–2 with respect to the phase of light beam 106 will depend upon the particular thickness glass wedges 504 and the magnitude of the signal voltage, and hence the electric field, applied to blocks 500–1 and 500–2. Wedges 504 are movable with respect to each other so that the thickness thereof may be adjusted to provide a desired phase difference, such as ninety degrees, between beams 112 and 106 in the absence of any signal voltage applied to blocks 500–1 and 500–2. The phase of beam 112 with respect to beam 106 is then modulated about the particular phase difference set by wedges 504 in accordance with the applied signal voltage.

It will be seen that since beams 106 and 112 are parallel to each other and have their centers spaced only a few millimeters apart, together they form a narrow composite light beam which may be transmitted to a distant receiver where they may be detected and the contained phase information demodulated. Any absolute phase alterations due to atmospheric effects which occur during the transmission of the composite beam to the receiver will effect the two component beams thereof essentially identically since they travel essentially the same path.

Although in FIGURE 5A glass wedges 504 are shown in the path of beam 108 impinging upon block 500–1, they may, alternatively, be placed either in the path of beam 106 or in the path of beam 112.

Figures 6A, 6B:
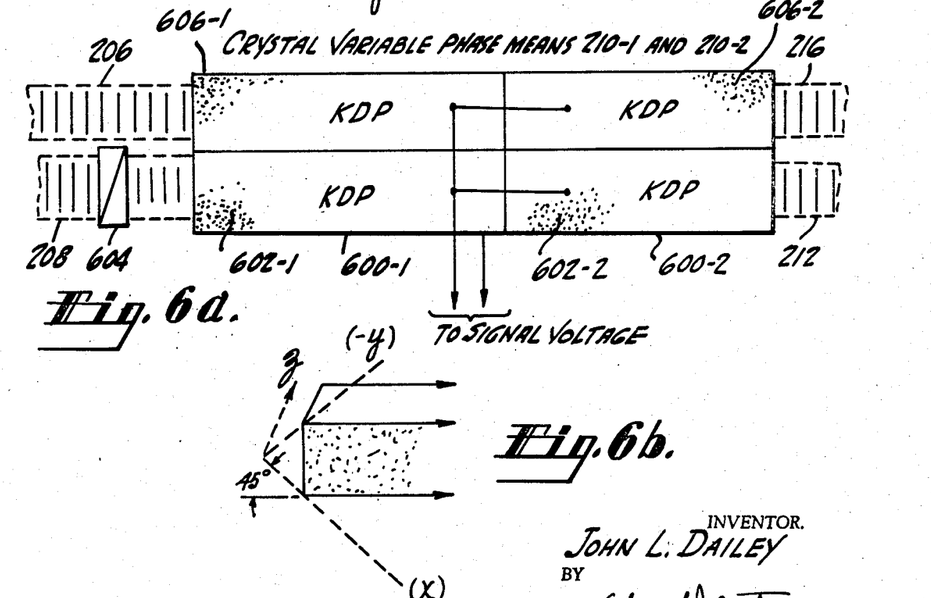
FIGURES 6A and 6B show a first preferred embodiment of the crystal variable phase means shown in FIGURE 2 which may be utilized when it is desired to obtain a phase modulation output.

Referring now to FIGURES 6A and 6B, there is shown one preferred embodiment of crystal variable phase means 210–1 and 210–2 of FIGURE 2. In FIGURE 6A, wedges 604 and KDP blocks 600–1 and 600–2 are respectively identical to wedges 504 and KDP blocks 500–1 and 500–2 shown in FIGURES 5A and 5B. However, in the case of FIGURE 6A, there is also included KDP blocks 606–1 and 606–2, which are located in the path of beam 206. These blocks, 606–1 and 606–2, as shown in FIGURE 6B, are cut in a manner similar to KDP blocks 600–1 and 600–2, described above, except that in the case of block 606–1 and 606–2 the length thereof lies in the phase defined by the $x$ and $y$ crystallographic axes thereof at an angle of $-45$ degrees with respect to the $x$ axis thereof, while the length of blocks 600–1 and 600–2 is at an angle of $+45$ degrees with respect to the $x$ crystallographic axis thereof. Thus, blocks 600–1 and 600–2 have their lengths parallel to one semi-axis of the electro-optic index of refraction ellipse while blocks 606–1 and 606–2 have their lengths parallel to the other semi-axis of the electro-optic index of refraction ellipse.

For all practical purposes, the index of refraction of a KDP crystal cut either in the manner of blocks 600–1 and 600–2 or in the manner of blocks 606–1 and 606–2 is a linear function of the applied electric field. However, the variation in the index of refraction of a block cut as 600–1 and 600–2 is positively sloped with respect to the polarity of the applied electric field, while the variation in the index of refraction of a block cut as block 606–1 and 606–2 is negatively sloped with respect to the polarity of the applied electric field. As an alternative, identically cut blocks may be subjected to electric fields of opposite polarity to provide difference in refractive index between the two blocks. Therefore, all other things being equal, the phase of beam 212 emerging from block 600–2 is varied in one direction in response to the given applied electric field while the phase of beam 216 emerging from block 606–2 is varied by an equal amount in the other direction in response to the same given applied electric field. Thus, the relative phase difference between beams 212 and 216 in response to an electric field will be twice that obtained from the single crystal variable phase means of FIGURES 5A and 5B, or, put another way, the same relative phase difference between the two beams may be obtained in the embodiment shown in FIGURES 6A and 6B with an electric field of half the magnitude required by the embodiment shown in FIGURES 5A and 5B.

It might be pointed out at this point that in practice all the optical crystals, such as those shown in FIGURES 4, 5A, 5B, 6A and 6B, as well as the figures to be described below, would be enclosed in a box filled with index oil having an index of refraction close to that of the crystals. This is done in order to minimize reflections. However, since this is conventional and would only obscure the drawings, a showing of the box and index oil have been omitted from the drawings.

Figure 8:
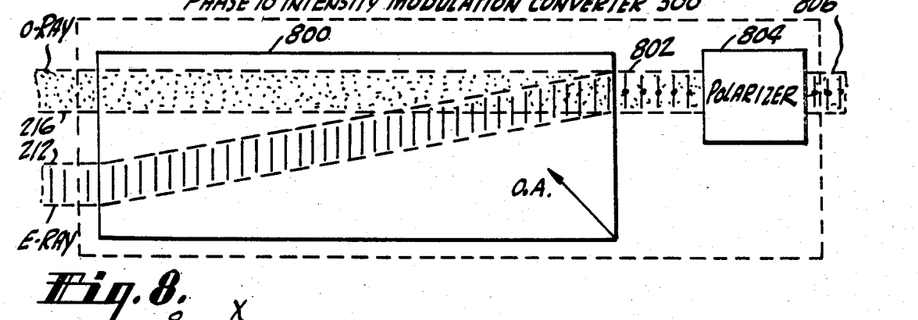
FIGURE 8 shows a first preferred embodiment of the phase-to-intensity modulation converter shown in FIGURE 3 which may be utilized when it is desired to obtain an intensity modulation output.

Further, it has been found in practice that the index oil near the KDP electrodes may be heated by induction heating of these electrodes when a high frequency signal voltage is applied. This results in a slight but still significant out-of-parallelism between the split beams applied to crystal 800 only when a high frequency signal is being applied which causes unwanted interference fringes to be produced in output beam 802. These unwanted interference fringes, if they occur, and the out-of-parallelism which causes them may be eliminated by inserting an additional pair of glass wedges, each cut at an angle such as two degrees and one of which may be rotated with respect to the other, in the path of one of the two split beams. After temperature equilibrium has been achieved with the signal voltage applied, the angular position of one of the additional wedges with respect to the other may be adjusted to a point at which the unwanted interference fringes disappear. At this point the beam passing through the additional wedges is bent by an amount just sufficient to compensate for the out-of-parallelism.

Figure 7:
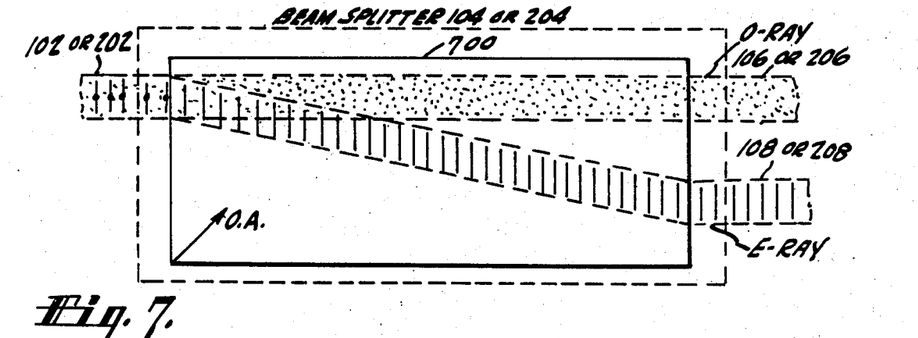
FIGURE 7 shows a second preferred embodiment of the beam splitter shown in FIGURES 1 and 2 which may be utilized when it is desired to obtain an intensity modulation output.

Referring now to FIGURE 7, there is shown a beam splitter which may be utilized either in FIGURE 1 or FIGURE 2 when it is desired to intensity modulate the light beam, rather than phase modulate the beam. As shown, the beam splitter of FIGURE 7 comprises solely a block of birefringent crystal material 700, such as calcite or sodium nitrate, which is identical to block 400 shown in FIGURES 4A and 4B except that it is of greater length so that the separation between the O ray and the E ray emerging therefrom is greater than that shown in FIGURES 4A and 4B. Although phase-to-intensity modulation converter 300, shown in FIGURE 8 will be discussed in detail below, it also includes, as shown, a block of birefringent crystal material 800, such as calcite or sodium nitrate which is identical in all respects to block 700. In fact, blocks 700 and 800 are obtained by taking an original block of material and cutting it exactly in half, one of the resulting two blocks being employed as block 700 and the other resulting block being employed as block 800. Block 800 is turned around with respect to block 700, so that with respect to the direction of the transmitted beam it appears optically as the mirror image of block 700.

Figure 9:
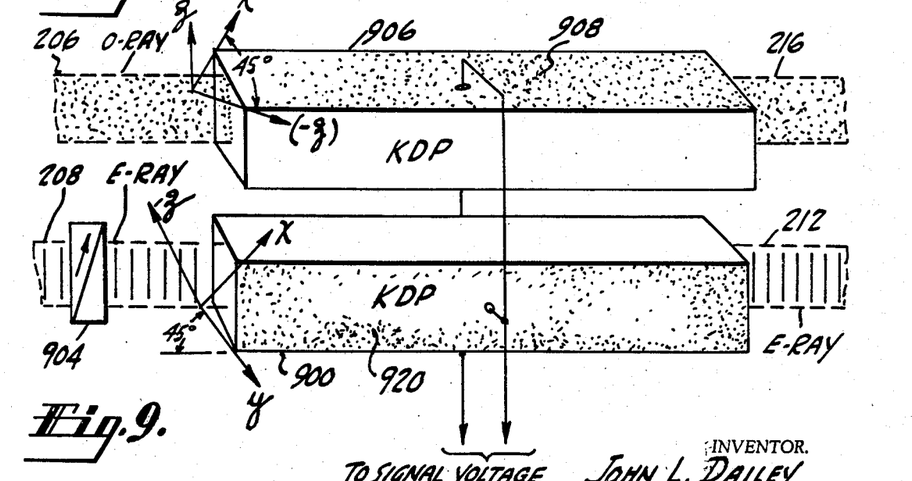
FIGURE 9 is a second preferred embodiment of the crystal variable phase means shown in FIGURE 2 which may be utilized when it is desired to obtain an intensity modulation output.

Referring now to FIGURE 9, light beam 208, having its electric vector polarized in the plane of the paper, is applied through movable glass wedges 904 to the front face of longitudinal KDP block 900, which is identical in cut and spatial orientation to blocks 600–1 and 600–2, shown in FIGURES 6A and 6B. Light beam 206, having its electric vector polarized in a direction into the paper, is applied to the front face of longitudinal block of KDP 906. Block 906 is identical in cut to blocks 606–1 of FIGURES 6A and 6B. However, due to the different polarization of beam 206 in FIGURE 9 from that in FIGURES 6A and 6B, in order to maintain the electric vector in the plane defined by the $x$ and $y$ crystallographic axes of block 906, the spatial orientation of block 906 is 90 degrees displaced with respect to that of block 601 in FIGURES 6A and 6B. Furthermore, in order to obtain an electric field in each of blocks 900 and 906 which is parallel to the $z$ crystallographic axis thereof, the signal voltage is applied to electrodes 902 of block 900 which, like electrodes 602–1, are located on opposite sides of block 900 in the plane of the paper, and to electrodes 908 of block 906 which are located on the top and bottom surfaces thereof, as shown. The reason that it is necessary to provide a greater separation between beams 206 and 208 when two parallel rows of KDP blocks are used than when only one row is used is to make room for the bottom electrode of block 906 and for insulation between this electrode and the electrode of opposite polarity on block 908. The phase difference between beam 212 emerging from block 900 and beam 216 emerging from block 906 depends upon the setting of glass wedges 904 and the magnitude of the applied signal voltage, as described above in connection with FIGURES 5A and 5B.

Referring back to FIGURE 8, beams 212 and 216 are applied to the front face of block 800, which causes the two beams to combine into a single composite beam 802 at the output thereof, as shown. In general, due to the phase difference between beams 212 and 216, composite beam 802 will be elliptically polarized. However, by properly setting light wedges 904 in FIGURE 9 in the absence of any signal voltage applied to KDP blocks 900 and 906 the phase of the component beam 212 of composite beam 802 and the phase of component beam 216 of composite beam 802 may be made equal to ninety degrees. In this case, in the absence of any applied signal voltage to KDP blocks 900 and 906, composite beam 802 will be circularly polarized.

As shown, composite beam 802 is applied through polarizer 804. If polarizer 804 is orthogonally oriented with respect to original laser beam 202 applied to the beam splitter of FIGURE 7, the circularly polarized composite beam 802 in the absence of any signal voltage, results in an output beam 806 emerging from polarizer 804 which has one half the intensity of composite beam 802 applied thereto. However, when a signal voltage is applied to blocks 900 and 906, composite beam 802 will become elliptically polarized and the intensity of output beam 806 will vary as a function of the applied signal voltage.

By merely eliminating KDP block 906, the configuration of FIGURE 1, with FIGURE 3 added, is obtained for the intensity modulation case.

Figure 10:
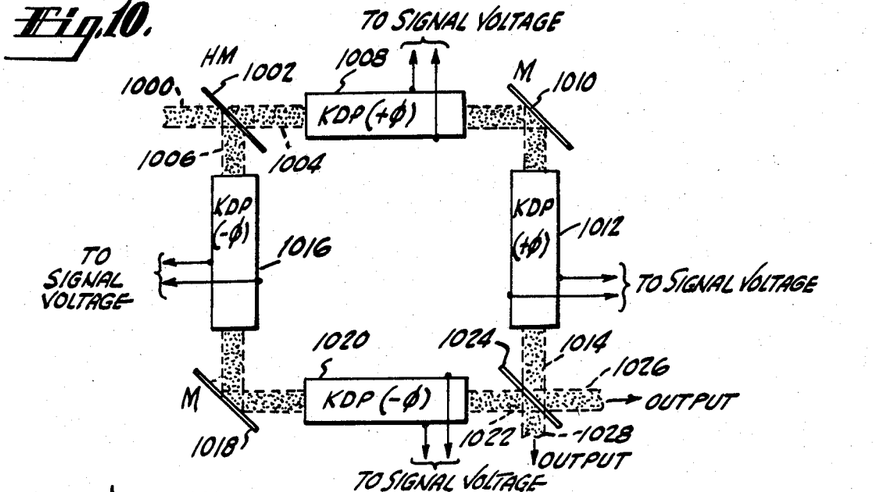
FIGURE 10 shows an alternative apparatus, somewhat similar to that employed in an interferometer, for obtaining an intensity modulated light beam.

Shown in FIGURE 10 is alternative apparatus, somewhat similar to that employed in an interferometer, for obtaining an intensity modulated light beam. More particularly, as shown, a plane polarized laser beam 1000 is applied to beam splitting half mirror 1002 to form separate component beams 1004 and 1006 of substantially equal amplitude. Beam 1004 is transmitted through a first block of KDP crystal 1008, and after being reflected by mirror 1010 is transmitted through a second block of KDP crystal 1012 to produce a first component output beam 1014. Each of blocks 1008 and 1012, respectively, is cut in a manner identical to that shown in FIGURES 5A and 5B and first component beam 1004 is polarized with its electric vector parallel to the plane defined by the $x$ and $y$ crystallographic axes of blocks 1008 and 1012, respectively. Therefore, for the reasons discussed above, the phase of light transmitted through blocks 1008 and 1012 will be varied in a positive sense with respect to the polarity of the signal voltage which is applied thereto to produce an electric field parallel to the $z$ crystallographic axis thereof.

Second component beam 1006 is transmitted through third block of KDP crystal 1016, and after being reflected by mirror 1018 is transmitted through block of KDP crystal 1020 to form second component output beam 1022. Each of blocks 1016 and 1020, respectively, is cut in a manner identical to that shown in FIGURES 6A and 6B and second component beam 1006 is polarized with its electric vector parallel to the plane defined by the $x$ and $y$ crystallographic axes of blocks 1016 and 1020, respectively. Therefore, for the reasons discussed above, the phase of light transmitted through blocks 1016 and 1020 will be varied in a negative sence with respect to the polarity of the signal voltage which is applied thereto to produce an electric field parallel to the $z$ crystallographic axis thereof. Thus, there will be a relative phase difference between first component output beam 1014 and second component output beam 1022, which is a function of the magnitude of the applied signal voltage.

As shown, first and second component output beams 1014 and 1022 are combined by half mirror 1024 to which they are applied to produce first output beam 1026 and second output beam 1028. Each of output beams 1926 and 1028, respectively, will have an amplitude, and hence an intensity, which is a function of the phase difference between bams 1014 and 1022, and hence is a function of the applied signal voltage. Either one or both of output beams 1026 and 1028 may be transmitted to a distant receiver.

Figure 11:
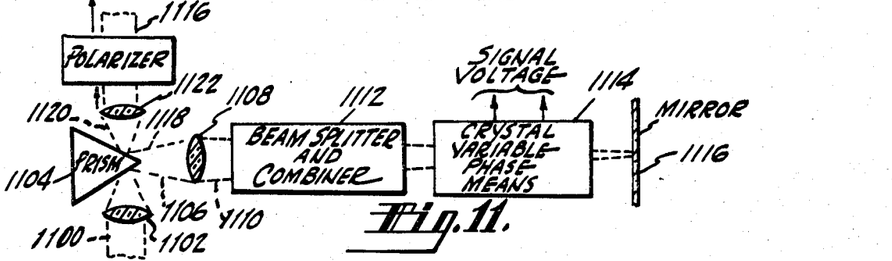
FIGURE 11 shows a first modification of the configuration shown in FIGURE 1 or the configuration shown in FIGURE 2 wherein the light beam is reflected to make two passes through the crystal variable phase means.
Figure 12:
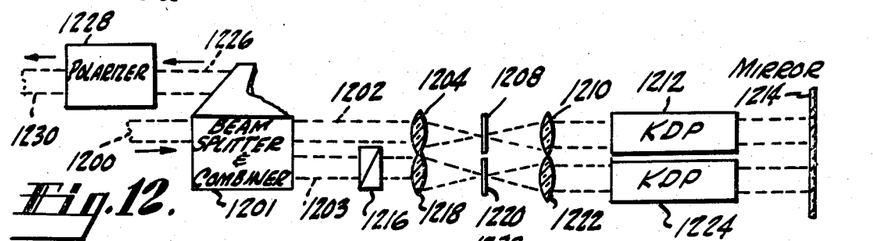
FIGURES 12 and 12A show a second modification of the configuration shown in FIGURE 2 wherein the light beam is reflected to make a plurality of passes, which may be greater than two, through the crystal variable phase means.

Referring now to FIGURES 11 and 12, there is shown two different modifications of the invention wherein the light beam is reflected to make a plurality of passes through crystal variable phase means similar to those shown in FIGURE 9. Since the light makes a plurality of passes through the crystal variable phase means, the effective path length of the light transmitted therethrough is multiplied by an integral factor. Since, as described above, the variation in phase is proportional to the product of the path length and magnitude of the applied electric field, effectively increasing the path length of the light through the crystal variable phase means makes it possible to employ an electric field of smaller magnitude, and hence a signal voltage of smaller magnitude, to obtain a given phase variation. This results in a lower dielectric heating of variable phase means than otherwise could be obtained.

Referring now in particular to FIGURE 11, plane polarized laser beam 1100 is focused by lens 1102 on the reflective lower surface of 90-degree prism 1104. Beam 1106, which is reflected therefrom, is applied through lens 1108 to produce beam 1110, which after passing through beam splitter and combiner 1112 and crystal variable phase means 1114 is focused on mirror 1116. Beam splitter and combiner 1112, which is shown in top view in FIGURE 11, is identical to the beam splitter shown in side view, in FIGURE 7. Crystal variable phase means 1114, also shown in top view of FIGURE 11, may be identical to the crystal variable phase means shown in FIGURE 9 or, in the alternative, block 906 shown in FIGURE 9 may be omitted. Mirror 1116 makes a small angle with the light incident thereon so that the direction of the beam of light reflected therefrom, after again passing through crystal variable phase means 1114 and beam splitter and combiner 1112, will be focused by lens 1108 to form beam 1118 which is focused on the top reflective surface of 90 degree prism 1104, as shown. Since the reflected beam is traveling essentially in the opposite direction from the incident beam, beam splitter and combiner 1112, which is effective in splitting the incident beam in the manner of the beam splitter of FIGURE 7, is effective in combining the split reflected beams in the manner of block 800 of FIGURE 8. Beam 1120 reflected from the top surface of prism 1104 is collimated by lens 1122 and then passed through polarizer 1124 to form output beam 1126 which is intensity modulated in accordance with the signal voltage applied to crystal variable phase means 1114.

Referring now to FIGURE 12, plane polarized laser beam 1200 is split into upper and lower beams 1202 and 1203, respectively, by beam splitter and combiner 1201, which is similar to that shown in FIGURE 7. Beam 1202 is focused by lens 1204 on hole 1206 of mirror 1208, which may take the form shown in FIGURE 12A. The light beam, after passing through hole 1206, is collimated by lens 1210 and passed through KDP crystal 1212, which has a modulating signal voltage, not shown, applied thereto. Upon emerging from KDP crystal 1212, the light beam is reflected by mirror 1214 back through KDP crystal 1212 at a slight angle into the paper. Lens 1210 will now focus the reflected beam on mirror 1208, but because of the slight angle of reflection provided by mirror 1214, the reflected beam will impinge on the reflecting surface of mirror 1208, rather than hole 1206. Therefore, the light beam will again be reflected back through KDP crystal 1212 through mirror 1214. This process will continue, with the light beam effectively "walking" across mirrors 1208 and 1214, respectively, until a reflected beam from mirror 1214 arrives at mirror 1208 oriented in line with hole 1216 therein, shown in FIGURE 12A. In this case, the reflected beam will proceed through mirror 1208 and be collimated by lens 1204 to impinge upon beam splitter and combiner 1201.

In a similar manner, beam 1203, after passing through wedge 1216 and lens 1218 is reflected back and forth by mirror 1220, which is identical to mirror 1208, and mirror 1214 through lens 1222 and KDP crystal 1224 to finally impinge again on beam splitter and combiner 1201 after passing through hole of mirror 1220 which corresponds with hole 1216 of mirror 1208. The two reflected beams impinging upon beam splitter and combiner 1201 are combined thereby into single beam 1226, which is applied through polarizer 1228 to produce output beam 1230, which is intensity modulated in accordance with the signal voltage, not shown, applied to KDP crystals 1212 and 1224.

In FIGURE 12 one of the two KDP crystals 1212 and 1224 may be omitted to provide a configuration corresponding with FIGURE 1, rather than FIGURE 2, of course.

Figure 12A:
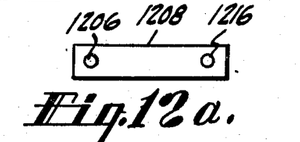
Figure 13:
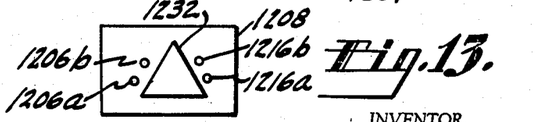
FIGURE 13 shows triangular shaped reflective surfaces.

In FIGURE 12, mirrors 1208 and 1220, instead of being of the type shown in FIGURE 12A, may, in the alternative, be of the type shown in FIGURE 13. As shown in FIGURE 12B, mirror 1208 and mirror 1220 includes a triangular shaped reflective surface 1232 having a plurality of pairs of holes, such as 1206A and 1216A, respectively, and 1206B and 1216B, respectively, which have, as shown, a different amount of spacing therebetween. If mirrors 1208 and 1220 are of the type shown in FIGURE 13, by adjusting the vertical position of these mirrors, any single pair of holes and the portion of reflecting surface 1232 therebetween may be made effective, while the rest of the holes in the remaining portion of reflecting surface 1232 are ineffective. This permits the number of passes of the respective light beams through KDP crystal 1212 and KDP crystal 1224 to be controlled in accordance with the vertical position to which mirrors 1208 and 1220, respectively, are adjusted.

What is claimed is:

1. In a light modulator, the combination comprising means for generating a beam of spatially coherent monochromatic light of a given wavelength, means for splitting said beam into respective separate plane polarized component beams of light, phase delay means including a given normally birefringent electrooptic crystal material operated in its transverse made which is substantially transparent to light of said given wavelength and which has an optic axis oriented in a first given direction in the absence of any electric field being applied thereto and means for applying an electric field to said crystal material in a direction substantially parallel to said first given direction to produce an electro-optic index of refraction ellipse in a given plane of said crystal material which is oriented perpendicular to said first given direction wherein a particular one of the axes of said ellipse is oriented in a second given direction in said given plane, and said crystal material being located with respect to said means for splitting said beam, effecting the application of solely said first component beam to said crystal material for transmission therethrough in a direction substantially parallel to said given plane at a predetermined angle with respect to said second given direction which is other than an odd integral multiple of forty-five degrees and with its electric vector polarized substantially parallel to said given plane, whereby said crystal material, in the absence of an electric field, appears substantially isotropic to the transmission of said first component beam therethrough and said first component beam emerges from said crystal material with a phase difference with respect to the phase of said second component beam which is a function of the product of the magnitude of said applied electric field and the path length in wavelengths traveled by said first component beam within said electric field through said crystal material.

2. The combination defined in claim 1, wherein said predetermined angle is an integral multiple, including zero, of ninety degrees, whereby the phase change of said first component beam transmitted through said crystal material per unit electric field is maximized.

3. The combination defined in claim 1, wherein said first component beam transmitted through said crystal material has a given cross section dimension parallel to said first given direction, wherein the thickness of said crystal material parallel to said first given direction is substantially the minimum necessary to accommodate said given cross section dimension, and wherein said means for applying an electric field comprises means for applying a voltage across the thickness of said crystal material, whereby the magnitude of said electric field per unit of voltage is maximized.

4. The combination defined in claim 3, wherein said first component beam transmitted through said crystal material has a second given cross section dimension parallel to said given plane, and wherein the width of said crystal material parallel to said given plane is substantially the minimum necessary to accommodate said second given cross section dimension, whereby the capacitance of said crystal material per unit length thereof substantially parallel to the path length of said first component beam transmitted therethrough is minimized.

5. The combination defined in claim 1, wherein said means for applying an electric field includes means for varying the magnitude of said electric field with respect to time in accordance with a signal, whereby said phase difference varies in accordance with said signal.

6. The combination defined in claim 1, wherein said crystal material has a given length substantially parallel to the transmission of said first component beam through said crystal material, and further including reflecting means for causing said first component beam to traverse the length of said crystal material a predetermined plural number of times, whereby the path length of said first component beam through said crystal material is a multiple of the length thereof.

7. The combination defined in claim 1, further including means for transmitting said second component beam entirely outside of said given crystal material of said phase delay means in the direction of said first component beam emerging from said given crystal material with the respective electric vectors thereof polarized in the same direction, whereby the respective centers of said second component beam and said first component beam emerging from said given crystal material are displaced from each other.

8. The combination defined in claim 7, wherein the distance said second component beam is displaced from said first component beam emerging from said given crystal material is substantially the minimum necessary to maintain said second component beam entirely outside of said given crystal material.

9. The combination defined in claim 1, further including second phase delay means including said given crystal material which is separate from said given crystal material of said first-named phase delay means and means for applying said electric field in a direction substantially parallel to the optic axis of said given crystal material of said second phase delay means to produce therein in a given plane perpendicular to the optic axis thereof an electro-optic index of refraction ellipse corresponding to the electro-optic index of refraction ellipse produced in said given crystal material of said first-named phase delay means and means for applying solely said second component beam to said crystal material of said second phase delay means for transmission therethrough in a direction substantially parallel to the plane of said ellipse thereof at said predetermined angle with respect to the axis of said ellipse thereof other than said particular one.

10. The combination defined in claim 1, further including means for combining said second component beam with said first component beam emerging from said given crystal material with their respective electric vectors substantially in coincidence with each other to obtain a resultant plane polarized output beam having an amplitude which is a function of the phase difference between said respective combined first and second component beams.

11. The combination defined in claim 1, further including means for combining said second component beam with said first component beam emerging from said given crystal material with their respective electric vectors orthogonal to each other to obtain an elliptically polarized resultant beam, and polarizing means having said resultant beam applied thereto for converting said resultant beam into a plane polarized output beam having an intensity which is a function of the phase difference between said respective combined first and second component beams making up said resultant beam.

References Cited

UNITED STATES PATENTS

| 2,385,086 | 9/1945 | D'Agostino et al. | 350—150 X |
| 3,356,438 | 12/1967 | Macek et al. | 350—150 |

OTHER REFERENCES

Billings, "The Electro-Optic Effect in Uniaxial Crystals of the Type $XH_2PO_4$. I. Theoretical" J.O.S.A. vol. 39, No. 10, October 1949, p. 797–801.

Sterzer et al., "Cuprous Chloride Light Modulators" J.O.S.A. vol. 54, No. 1, January 1964, pp. 62–68.

PAUL R. GILLIAM, Primary Examiner

U.S. Cl. X.R.

350—151, 157, 161